(12) United States Patent
Arno

(10) Patent No.: US 6,576,573 B2
(45) Date of Patent: Jun. 10, 2003

(54) ATMOSPHERIC PRESSURE PLASMA ENHANCED ABATEMENT OF SEMICONDUCTOR PROCESS EFFLUENT SPECIES

(75) Inventor: Jose I. Arno, Brookfield, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/781,037

(22) Filed: Feb. 9, 2001

(65) Prior Publication Data

US 2002/0111045 A1 Aug. 15, 2002

(51) Int. Cl.$^7$ .......................... H01L 21/26; B01D 50/00
(52) U.S. Cl. ......................... 438/798; 438/905; 422/172
(58) Field of Search ................................ 438/798, 905; 422/168, 172, 186.04

(56) References Cited

U.S. PATENT DOCUMENTS

| | | | |
|---|---|---|---|
| 5,759,237 A | * | 6/1998 | Li et al. ........................... 95/41 |
| 5,955,037 A | * | 9/1999 | Holst et al. .................. 422/171 |
| 6,027,616 A | | 2/2000 | Babko-Malyi |
| 2001/0001435 A1 | * | 5/2001 | Palekar et al. ............... 204/164 |

FOREIGN PATENT DOCUMENTS

KR    2001063392    * 7/2001    ........... H01L/21/30

OTHER PUBLICATIONS

L.A. Rosocha, et al., "Treatment of Hazardous Organic Wastes Using Silent Discharge Plasmas", Chemical and Laser Science Division, University of California, Los Alamos National Laboratory Los Alamos, New Mexico, 87545, USA, pp. 282–308, 1993.

William O. Heath, et al., "Nonthermal Plasma Technology for Organic Destruction", Pacific Northwest Laboratory, pp. 1–4.

Hans R. Snyder, "Effect of Air and Oxygen Content on the Dielectric Barrier Discharge Decomposition of Chlorobenzene", IEEE, Transactions of Plasma Science, vol. 26, No. 6, Dec. 1998, pp. 1695–1699.

Jen–Shih Chang, et al., "Corona Discharge Processes", IEEE Transaction on Plasma Science, vol. 19, No. 6, Dec. 1991.

Bernard T. Merritt et al., "Non–Thermal Plasma Processing of VOCs and Nox at LLNL", Air & Waste Management Association, Presented at the 88$^{th}$ Annual Meeting & Exhibition, San Antonio, TX, Jun. 18–23, 1995.

* cited by examiner

Primary Examiner—Amir Zarabian
Assistant Examiner—Pamela Perkins
(74) Attorney, Agent, or Firm—Margaret Chappuis; Steven J. Hultquist

(57) ABSTRACT

The present invention relates to a method and system for non-thermal abatement of effluent species generated in a semiconductor processing unit. In the method, an effluent stream is introduced into a discharge reactor wherein the components of the effluent stream are subjected to a corona discharge and maintained therein for a sufficient time to detoxify and/or dissociate the harmful components of the effluent stream. The discharge reactor, maintained at approximately atmospheric pressure, is positioned after the low-pressure semiconductor processing chamber and connecting vacuum pump system to limit interference with the semiconductor plasma processing tool.

24 Claims, 3 Drawing Sheets

ATMOSPHERIC PRESSURE PLASMA ENHANCED ABATEMENT OF SEMICONDUCTOR PROCESS EFFLUENT SPECIES

BACKGROUND OF THE INVENTION

1. Field of the Invention

The present invention relates generally to plasma generation and more specifically to plasma abatement methods and systems for treatment of waste emissions from a semiconductor processing chamber.

2. Description of the Related Art

Release of gases that are toxic to humans or generally harmful to the global environment, is of growing concern to industrial producers of such emissions. The semiconductor industry is one of the many industries particularly affected because the fabrication of computer chips involves toxic chemicals, e.g., arsine, phosphine, and chlorine. Other very stable compounds are also generated in semiconductor manufacturing processes that are capable of reaching the upper atmosphere and inflicting serious and long-term damage to the planetary climate. Consequently, governments worldwide are taking a more aggressive role in legislating and regulating the amount of air pollution generated by the semiconductor industry.

In the current state of the art, it is conventional to treat effluent gases from semiconductor processing with several different abatement methods, including thermal destruction, and wet and dry scrubbing. Many semiconductor companies presently use central burn tubes and scrubbers to treat the gases before they are vented to the atmosphere. However, the efficiency of thermal destruction is limited by the thermal stability of the effluent species. The high temperatures required to decompose some materials can only be achieved by using electric furnaces or reactant gases that release energy via exothermic reactions. This is especially true when abating highly stable perfluorinated compounds. Both methods use a significant amount of resources leading to high costs of ownership. Furthermore, when certain chloride compounds are exposed to high temperatures in the presence of oxygen, they can react to form extremely hazardous polychlorinated compounds. Additionally, the high temperatures reached in thermal furnaces result in a significant increase in the degradation rate of materials of construction leading to a shorter lifetime of the abatement units.

Traditional dry and wet scrubbing techniques are limited in their ability to destroy certain effluent compounds such as organic chlorides. Additionally, dry scrubbing methods use vessels containing beds of adsorbent material whose surface physically adsorbs the molecules of the effluent species being abated, but such methods produce a vessel of hazardous material for disposal. Likewise, wet scrubbing techniques produce large quantities of contaminated fluids that must be disposed as toxic waste thereby increasing the cost of the abatement system and associated semiconductor manufacturing facility.

Recently, a new generation of abatement systems have been developed using non-thermal low pressure plasma reactors. Unlike thermal systems, wherein molecular decomposition occurs via thermodynamic dissociation, non-thermal plasmas use electron-molecule collisions to dissociate molecules. Typically, these non-thermal reactors use microwave or radio frequency energy sources and must be positioned between the processing chamber and the semiconductor vacuum pump because they operate at reduced pressures. However, placement of these non-thermal plasma systems between the processing chamber and the vacuum pump, can present problems such as deposit formation, viz., the precipitation of solids in the vacuum pump, which causes clogging of the exhaust lines leaving the vacuum pump. Additionally, the positioning of the plasma abatement system near the processing chamber may adversely affect the semiconductor tool and processing.

It would, therefore, be desirable to provide an improved abatement method that does not generate highly reactive radicals, form perfluorinated greenhouse gases, precipitate blocking solids in a vacuum system and/or generate voluminous quantities of hazardous material that increase production costs, disposal costs, and exposure risks to personnel.

SUMMARY OF THE INVENTION

The present invention generally relates to plasma abatement systems and methods, and more specifically to use of low-temperature plasma to abate semiconductor process effluents.

The invention in various embodiments described hereinafter in greater detail, contemplates:

- an abatement device that may be coupled into existing point of use abatement systems, such as wet, dry and thermal systems;
- an abatement plasma system that is positioned after the semiconductor vacuum pump system thereby not affecting the semiconductor tool, process, or the operation of the pump;
- an abatement plasma process that is conducted at atmospheric pressure thereby eliminating the need for placement of the abatement plasma chamber before a vacuum pump in the semiconductor processing system; and
- an improved plasma abatement method that does not generate unnecessary amounts of a hazardous waste for disposal.

In one method aspect, the invention relates to non-thermal abatement of effluent species generated in a semiconductor processing unit, comprising the following steps:

a) introducing an effluent stream into a discharge reactor, the stream having products and unused gaseous components from a semiconductor processing chamber;

b) subjecting the effluent stream to a corona discharge in the discharge reactor; and c) maintaining the effluent stream in the discharge reactor for a sufficient time to allow components of the effluent stream to react with energized electrons to destroy or render harmless the products and unused gaseous components. Preferably, the discharge reactor is maintained at approximately atmospheric pressure.

In another method aspect, the invention relates to the introduction of a gas mixture comprising an effluent gas stream from a semiconductor process and a reactive partner into a discharge reactor, such method comprising the steps of:

a) introducing a gas mixture into a discharge reactor, the gas mixture comprising an effluent gas stream from a semiconductor processing chamber and a reactive partner;

b) subjecting the gas mixture to a corona discharge in the discharge reactor; and c) maintaining the gas mixture in the discharge reactor for a sufficient time to allow components of the effluent gas stream to react with energized electrons and reactive partners to destroy and/or convert the gas stream components. Preferably the reactive partners include gases that are easy sources of electrons (i.e., easily ionizable species, such as argon) and/or gases that enhance oxidative or reductive reactions of the products and unused gaseous components in the effluent stream.

A further aspect of the invention relates to a method for introducing an effluent gas stream from a semiconductor process into an abatement chamber, at approximately atmospheric pressure, wherein a corona discharge zone is created and a secondary abatement process is concurrently performed in the abatement chamber. Such abatement method comprises the steps of:

a) removing an effluent gas stream, comprising products and unused gaseous components, from a semiconductor processing chamber through a connecting vacuum system and introducing the effluent gas stream into an abatement chamber; and b) subjecting the effluent stream to a corona discharge in the abatement chamber for a sufficient time to render harmless the components of the effluent stream while subjecting the harmless components and gas stream to a secondary abatement method for separation of gaseous and solid components.

Other aspects, features and embodiments of the invention will be more fully apparent from the ensuing disclosure and appended claims.

DETAILED DESCRIPTION OF THE INVENTION AND PREFERRED EMBODIMENTS THEREOF

The present invention is based on the discovery that considerable benefit may be obtained by positioning a discharge reactor, maintained at approximately atmospheric pressure, after the processing chamber and vacuum pump system in the semiconductor processing unit. In particular it has been found that formation of unwanted precipitating deposits is greatly reduced thereby, essentially eliminating blockage formation in the vacuum pump and/or exhaust lines leaving the vacuum pump. Additionally, placement of the plasma abatement system after the vacuum system and away from the semiconductor processing chamber reduces interference with the processing tool.

The present invention provides for methods and systems for non-thermal plasma abatement of harmful unused semiconductor processing gases and reactive products formed in a semiconductor processing chamber. The plasma abatement involves using a plasma source to convert toxic or environmentally harmful emissions into harmless substances.

Figure 1:
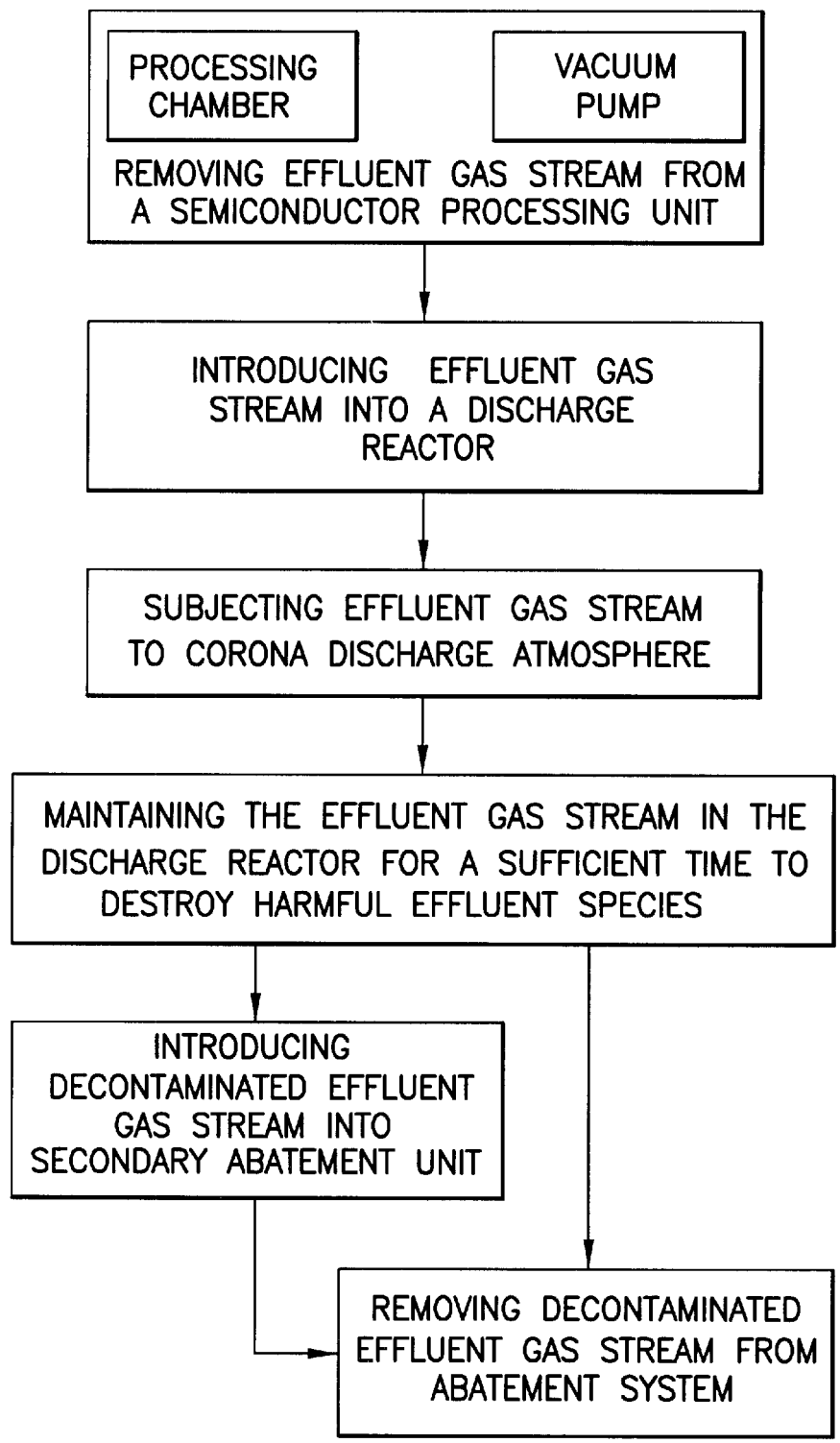
FIG. 1 is a flow diagram setting forth a general processing scheme of the invention.

FIG. 1 is a flow diagram of a typical treatment method according to one embodiment of the present invention. As shown in FIG. 1, an effluent gas stream from a semiconductor processing unit having reaction products and unused gaseous components therein is introduced into a discharge reactor. The components and products may include volatile organic compounds, other organic species such as perfluorinated compounds, and inorganic gases including nitrogen oxides and carbon oxides. Within the discharge reactor, the effluent gas stream is subjected to energized electrons generated in the discharge reactor. The components and products are maintained in the discharge reactor for a sufficient time to accomplish detoxification or dissociation thereby destroying or rendering harmless the products and unused gaseous components.

After detoxification and/or dissociation is completed, the gas stream is removed and may be introduced into a secondary abatement system for further treatment.

Figure 2:
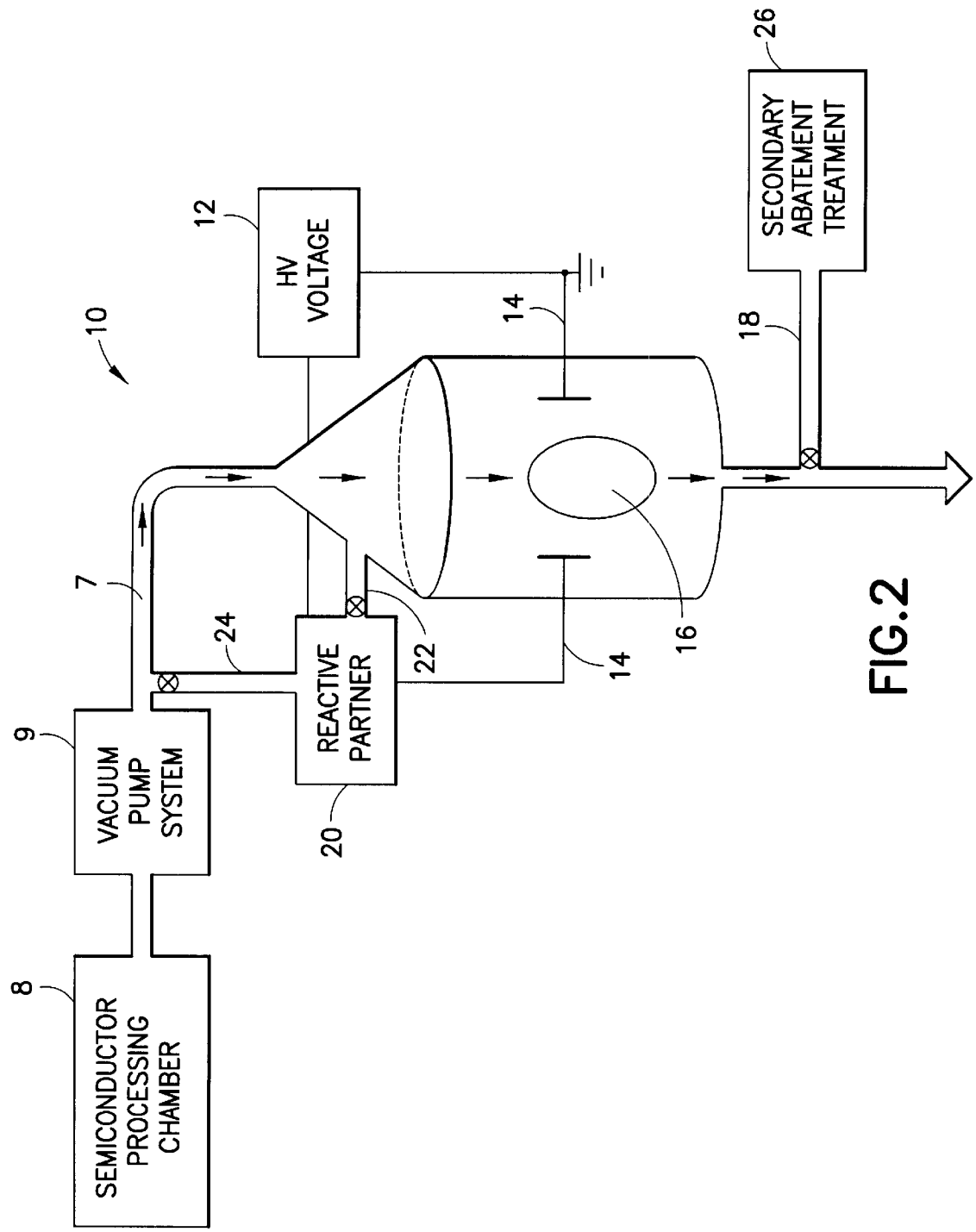
FIG. 2 illustrates implementation of the invention in a corona discharge reactor.

With reference to FIG. 2, the practice of gas abatement in one embodiment involves a semiconductor process chamber 8 wherein a workpiece is exposed to a gas or gas mixture. In another embodiment, the process chamber may be exposed to a gas or gas mixture for the purpose of cleaning the interior of chamber wherein no workpiece is present. In either embodiment, the gas stream effluent is withdrawn from the processing chamber by a vacuum pump 9 and introduced into a discharge reactor 10. The discharge reactor 10 is positioned downstream of the processing chamber 8 and is operatively connected to the processing chamber 8 through the vacuum pump by conduit 7.

In the practice of the present invention, the discharge reactor 10 comprises at least a single pair of electrodes wherein a corona discharge atmosphere is generated by any conventional manner. The discharges are a result of applying high voltage energy to at least one of the electrodes to generate a corona discharge.

The corona discharges are well suited for promoting chemical reactions in processes at atmospheric pressures. Depending on the type and components of the discharge reactor, the high voltage produces an electric field, either uniform or non-uniform in character, between the electrodes which results in the breakdown of the gases in the electric field and the production of a corona glow. An electrical current comprising electrons and ions flows across the gap between the electrodes. The electrons can undergo inelastic collisions with gas molecules, transfer their energy to the gas molecules and raise the molecules to excited energy states. The excited gas molecules may release this energy by several actions, such as emitting light that causes the characteristic glow of the corona discharge, or by entering into chemical reactions, or by dissociating.

The corona discharge is generated by applying direct or alternating high voltage from source 12 across electrodes 14 located within the discharge reactor. The electrodes are positioned to provide an electric field between the electrodes thereby creating a corona discharge zone 16 wherethrough the effluent gas stream must pass. The placement of the electrodes and geometry of the gaps therebetween is readily optimized for the specific geometry of the discharge reactor chamber, within the skill of the art, based on the disclosure and teachings herein.

The effluent gas stream is flowed into the corona discharge zone at a flow rate sufficient for the effluent gas stream components to be decomposed, dissociated, and/or destroyed. One skilled in the art will understand that the actual residence time in the discharge reactor depends on the stability of the molecules in the effluent gas stream, and as such, will adjust the flow rate of the gas into the discharge reactor accordingly.

Generally, the electrodes 14 are made from any suitable electrically conductive material. Additionally the electrodes need to be constructed of a material that is able to withstand the gaseous molecules used in the semiconductor processing chamber as etching materials, such as halogenated etching compounds. Preferably, the electrodes are fabricated from metals such as stainless steel, gold and platinum or at least the surface of the electrode is coated with such metals.

The power supply means 12 preferably provides a pulsed or continuous voltage across the discharge electrodes 14 in an amount that is sufficient to create a corona discharge but not rise to the level that initiates an arc discharge. Preferably, applicable voltages ranges from about 2,500 volts to about 50,000 volts and more preferably, from about 10,000 volts to about 30,000 volts. The power supply means 12 employed in the practice of the present invention may comprise any conventional AC or DC source that supplies a sufficient frequency to make an electric current flow between the electrodes and any insulating or dielectric material positioned within the discharge gap. Where a conventional 60 Hz AC source can be used to generate the electric current, stepping up the frequency to a range between about 1 KHz and about 10 MHz may be desirable to produce more uniform electric fields.

The shape of the electrodes and placement of the electrodes will determine the uniformity of the electric field. A non-uniform electric field can be obtained through at least one electrode having an asymmetrical shape such as a small curvature. When generating a corona discharge in a non-uniform field, an insulator may be provided between the electrodes to reduce the shifting of the corona discharge to an arc discharge. The insulator may be an inorganic material, such as quartz glass and alumina or an organic material, such as Teflon, polyimide, polyethylene or polyethylene terephthalate.

If there is a dielectric or ferroelectric material placed in the space between the electrodes, a uniform electric field may be generated. The dielectric material layer reduces sparkover from occurring and allows a diffuse uniform electric field to develop across the gap. Generally, any dielectric material may be used that can withstand high voltage and can withstand the corrosive environment of exposure to unused etching gases including, materials such as ceramics, silicate glass, borate glass, phosphate glass, or the like. In the alternative, the dielectric material may be coated directly onto at least a portion of the electrodes. Transpirational tubes made of porous materials can be used to reduce deposition of solid by-products generated by the dielectric reaction.

In another aspect of the present invention, a reactive partner such as an oxidizing or reducing agent may be added to the effluent gas stream to form a gas mixture that is exposed to the electric field within the discharge reactor. The gas molecules in the effluent gas stream are dissociated by electron impact collision in the plasma and thus a suitable reactive partner may be introduced into the gas stream to react with the molecular fragments. Such reactive partner may include hydrogen and oxygen containing compounds, such as $O_2$, and $O_3$. The reactive partners 20 may be added directly into the discharge chamber at conduit 22 or added upstream from the discharge reactor through conduit 24. Alternatively, a solid reactive partner such as silicon or silicon dioxide can be added to the discharge reactors. Easily ionizable gases such as argon can be added to the reactant mixture to increase the electron density in the reaction chamber therefore enhancing the destruction efficiency.

The plasma abatement system of the present invention can be combined with any conventional point of use exhaust scrubbers that are used to receive exhaust gases at their point of generation. As illustrated in FIG. 2 the detoxified or dissociated effluent gas stream can be introduced into a secondary abatement unit 26 via conduit 18, to remove the detoxified or deactivated constituents of the gas stream. Any abatement unit may be utilized that separates the unwanted products from the gas stream for final disposal including thermal, wet or dry scrubbing, or electrostatic deposition units.

For instance, the secondary abatement system may comprise a scrubbing liquid that upon mixing with a deactivated gas stream will cool the components therein so that the resultant temperature drop causes a separation of particles from the gas stream. It should be noted that if the detoxified or deactivated constituents include any acid components, a suitable solvent having an alkaline nature may be used for neutralization purposes in the secondary scrubbing device.

Additionally, if clusters of larger particles form during the corona discharge treatment, the gas stream may be introduced to an electrostatic separator for final separation.

Figure 3:
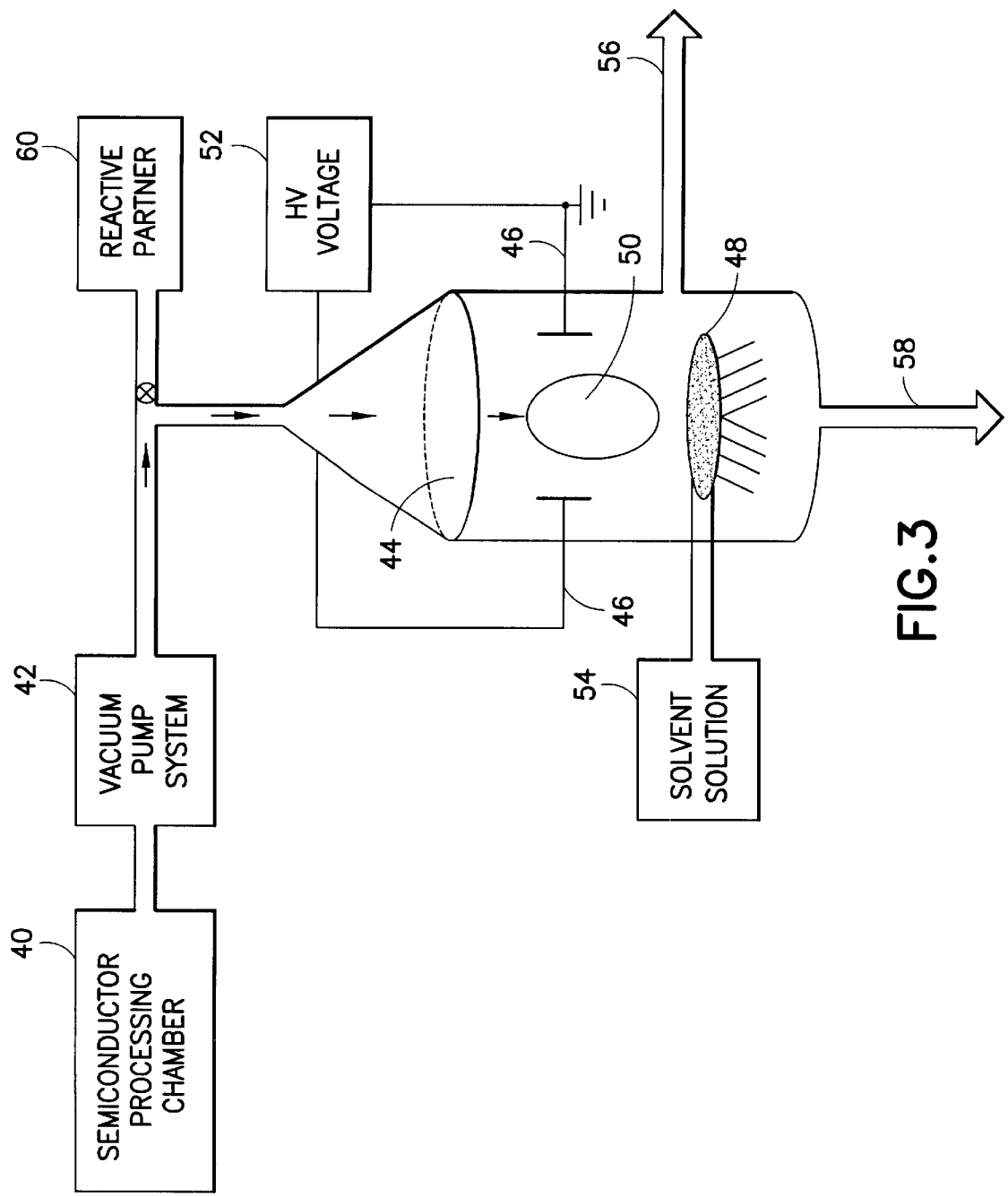
FIG. 3 illustrates an alternative embodiment utilizing a secondary abatement system.

The discharge reaction system illustrated in FIG. 3 provides an alternative embodiment for plasma abatement wherein a secondary abatement method is coupled with the plasma abatement method and incorporated into a single abatement chamber. Referring to FIG. 3, an effluent gas stream containing harmful and/or toxic constituents is drawn from the processing chamber 40 by the vacuum pump unit 42 and introduced into the abatement chamber 44. The abatement chamber comprises at least two electrodes 46, a high voltage and ground, and a secondary abatement system such as wet scrubbing unit 48. The effluent gas stream passes initially through a corona discharge zone 50 created, as discussed above in connection with FIG. 2, by providing suitable electrodes 46 which are energized by a high voltage power supply 52.

Constituents in the gas stream are decomposed or dissociated in the corona discharge zone 50 leading to a detoxified and deactivate gas stream that may contain particles and/or solids that are subsequently separated and removed by a scrubbing solvent solution 54 sprayed from scrubbing spray head 48. The separated and purified gases may rise and be removed from the discharge reactor through conduit 56 while the scrubbing liquid, containing deactivated and/or detoxified constituents, may be removed through conduit 58. A reactive partner 60 may be introduced as described above.

While the invention has been described herein with reference to specific features, aspects and embodiments, it will be recognized that the invention may be widely varied, and that numerous other variations, modifications and other embodiments will readily suggest themselves to those of ordinary skill in the art. Accordingly, the ensuing claims are to be broadly construed, as encompassing all such other variations, modifications and other embodiments, within their spirit and scope.

What is claimed is:

1. A non-thermal plasma method for abatement of effluent species generated in a semiconductor processing unit, said method comprising:
    withdrawing an effluent stream from said semiconductor processing chamber by a vacuum pump;
    introducing the effluent stream from the vacuum pump into a corona discharge reactor at approximately atmospheric pressure;
    subjecting the effluent stream to a corona discharge in the corona discharge reactor; and
    maintaining the effluent stream in the corona discharge reactor for a sufficient time to destroy effluent species.

2. The non-thermal plasma method according to claim 1 wherein the corona discharge is generated by applying a high electrical voltage between electrodes in the discharge reactor.

3. The non-thermal plasma method according to claim 1 wherein the discharge reactor is positioned as a point of use abatement reactor.

4. The non-thermal plasma method according to claim 1 wherein the discharge reactor is combined with a further abatement system selected from the group consisting of a dry scrubber, wet scrubber and a thermal decomposition reactor.

5. The non-thermal plasma method according to claim 2 wherein the electrodes are at least a single pair of electrodes and the voltage applied across the electrodes is about 10,000 to about 30,000 volts.

6. The non-thermal plasma method according to claim 1 wherein the discharge reactor is located downstream of the semiconductor processing chamber.

7. The non-thermal plasma method according to claim 1 further comprising the addition of an oxidizing or reducing agent to the effluent stream.

8. The non-thermal plasma method according to claim 1 wherein the effluent stream comprises gaseous and solid compounds.

9. The non-thermal plasma method according to claim 2 wherein the electrodes are a high voltage electrode and a ground electrode.

10. The non-thermal plasma method according to claim 9 wherein the discharge reactor further comprises a dielectric or ferroelectric material positioned between the high voltage electrode and ground electrode.

11. The non-thermal plasma method according to claim 10 further comprising at least one transpirational tube comprising a porous material to reduce deposition of solid by-products generated by a dielectric reaction.

12. The non-thermal plasma method according to claim 9 wherein the discharge reactor further comprises insulators.

13. The non-thermal plasma method according to claim 2 wherein the high voltages are DC or AC.

14. The non-thermal plasma method according to claim 2 wherein the voltage is applied by a voltage regime selected from the group consisting of pulsed voltage regimes and continuous voltage regimes.

15. A non-thermal plasma method for abatement of effluent species generated in a semiconductor processing unit, the method comprising:
   a) withdrawing an effluent gas stream from the semiconductor processing unit by a vacuum pump;
   b) introducing a gas mixture into a corona discharge reactor at approximately atmospheric pressure, the gas mixture comprising the effluent gas stream from the vacuum pump and a reactive partner;
   c) subjecting the gas mixture to a corona discharge zone in the discharge reactor; and
   d) maintaining the gas mixture in the corona discharge reactor for a sufficient time to allow components of the effluent gas stream to react with energized electrons and reactive partners to destroy and/or convert effluent species in the effluent gas stream.

16. The non-thermal plasma method according to claim 15 wherein the corona discharge is generated by applying a high electrical voltage between electrodes in the discharge reactor, the electrodes comprising a high voltage electrode and a ground electrode.

17. The non-thermal plasma method according to claim 15 wherein the discharge reactor is combined with a further abatement system selected from the group consisting of a dry scrubber, wet scrubber and a thermal decomposition reactor.

18. The non-thermal plasma method according to claim 15 wherein the discharge is located downstream of the semiconductor processing chamber.

19. The non-thermal plasma method according to claim 16 wherein the discharge reactor further comprises a dielectric or ferroelectric material positioned between the high voltage electrode and ground electrode.

20. The non-thermal plasma method according to claim 15 wherein the reactive partner is an easily ionizable gas.

21. A non-thermal plasma abatement method comprising:
   a) removing an effluent gas stream from a semiconductor processing chamber by a connecting vacuum system and introducing the effluent gas stream from the connecting vacuum system into an abatement chamber; and
   b) subjecting the effluent gas stream to a corona discharge at approximately atmospheric pressure in the abatement chamber for a sufficient time to render harmless the components of the effluent stream while concurrently subjecting the gas stream and harmless components to a secondary abatement method for separation of gaseous and solid components.

22. The non-thermal plasma method according to claim 21 wherein the corona discharge is generated by applying a high electrical voltage between electrodes in the discharge reactor.

23. The non-thermal plasma method according to claim 21 wherein the secondary abatement method is selected from dry scrubbing, wet scrubbing and thermal decomposition.

24. The non-thermal plasma method according to claim 21 further comprising the addition of an oxidizing or reducing gas to the effluent gas stream.

* * * * *